(12) United States Patent
Hiramatsu (10) Patent No.: US 6,778,616 B1
(45) Date of Patent: Aug. 17, 2004

(54) RADIO RECEPTION APPARATUS AND RECEIVED POWER AMPLIFICATION METHOD

(75) Inventor: Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/674,556

(22) PCT Filed: Mar. 3, 2000

(86) PCT No.: PCT/JP00/01255

§ 371 (c)(1),
(2), (4) Date: Nov. 2, 2000

(87) PCT Pub. No.: WO00/54528

PCT Pub. Date: Sep. 14, 2000

(30) Foreign Application Priority Data

Mar. 6, 1999 (JP) .......................... 11-103045

(51) Int. Cl.⁷ ............................................. H04L 27/08
(52) U.S. Cl. ...................... 375/345; 375/330; 375/316; 375/254; 375/455; 370/335; 330/129; 330/134
(58) Field of Search .............................. 375/345, 316, 375/254, 330, 455; 370/335; 330/129, 134

(56) References Cited

U.S. PATENT DOCUMENTS 4,380,737 A * 4/1983 Sanders ...................... 330/134
5,450,035 A * 9/1995 Kinoshita ................... 330/129
5,485,486 A * 1/1996 Gilhousen et al. .......... 370/335

FOREIGN PATENT DOCUMENTS

| JP | 08335928 A | * 12/1996 | ............ H04J/13/00 |
| JP | 8335928 | 12/1996 | |
| JP | 10164014 | 6/1998 | |
| JP | 10164014 A | * 6/1998 | ............ H04J/13/04 |

OTHER PUBLICATIONS

PCT International Search Report dated Jun. 13, 2000.

* cited by examiner

Primary Examiner—Shuwang Liu
(74) Attorney, Agent, or Firm—Stevens, Davis, Miller & Mosher, LLP (57) ABSTRACT

In a radio reception apparatus, a judgement unit judges inter-transmission users. A controller specifies the number of inter-transmission users in accordance with the judgement result. The controller calculates a power value of a received signal per one person of inter-transmission user from both of a power value of the received signal and the number of inter-transmission users. The controller estimates a power value in the case where all the members of inter-communication users come into inter-transmission users from both of the calculated power value and the number of inter-communication users.

10 Claims, 5 Drawing Sheets

FIG.1

RELATED ART

RADIO RECEPTION APPARATUS AND RECEIVED POWER AMPLIFICATION METHOD

This application is a continuation application No. PCT JP00/01255 filed Mar. 3, 2000.

TECHNICAL FIELD

The present invention relates to a radio reception apparatus and received power amplification method.

BACKGROUND

Figure 1:
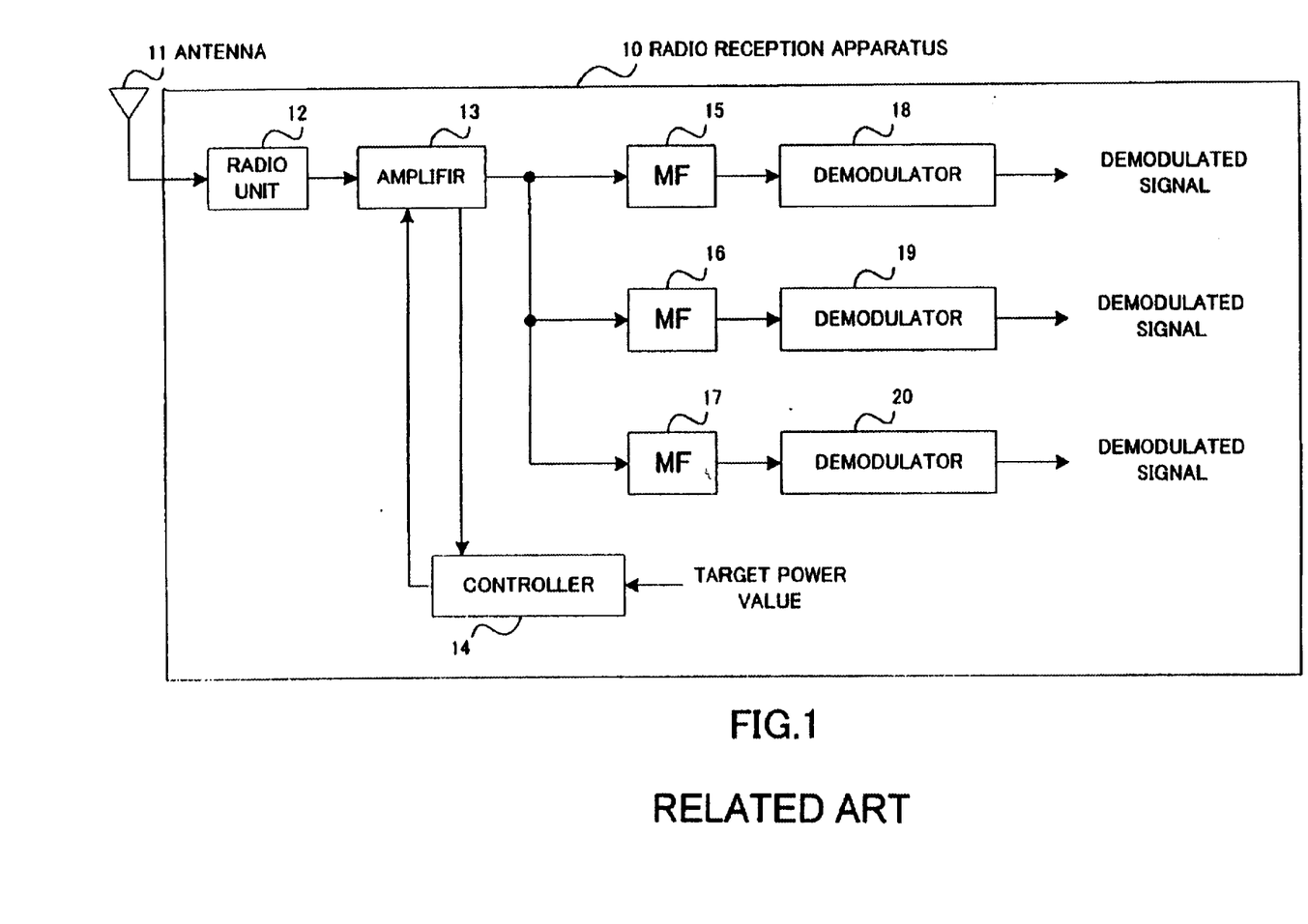
FIG. 1 is a block diagram illustrating a configuration of a conventional radio reception apparatus.

FIG. 1 is a block diagram illustrating a configuration of a conventional radio reception apparatus employed for a communication in which a CDMA system is utilized. In a radio reception apparatus 10, a signal received by an antenna 11 is subjected to predetermined radio processing at a radio unit 12, before being outputted to an amplifier 13.

The amplifier 13 outputs a signal indicating a power value of a received signal to a controller 14. The controller 14 calculates an amplification factor from the power value of the received signal and a target power value so that the power value of signal outputted to matched filters 15, 16, and 17 from the amplifier 13 comes into constant value in conformity with the target power value. Then the controller 14 performs feedback of a control signal instructing the amplification factor to the amplifier 13. The amplifier 13 amplifies power of a received signal in accordance with the amplification factor undergoing the feedback, thus, outputting the amplified signal to the matched filters 15, 16, and 17.

Further, the power value of the received signal outputted to the controller 14 from the amplifier 13 employs an average value being average over a predetermined time interval in order to relieve an influence of a noise. Further, in the case where the radio reception apparatus 10 receives signals transmitted from a plurality of radio transmission apparatus, a power value of a received signal outputted to the controller 14 from the amplifier 13 comes into a power value of the received signal which is subjected to code division multiplexing.

The matched filters 15, 16, and 17 each gives despreading processing to an amplified signal, thus, calculating correlation value between the amplified signal and spreading code to output to demodulators 18, 19, and 20 respectively. The demodulators 18, 19, and 20 each gives predetermined demodulation processing to the amplified signals on the basis of the respective correlation values to output demodulated signals to A/D converter and so forth at latter stages.

However, there is a problem in the amplification of a received signal which is executed in the conventional radio reception apparatus as follows.

Namely, in the case where there exists users who do not transmit signals actually because the users have no data to be transmitted in an interval (hereinafter referred to as inter-communication user) in a plurality of radio transmission apparatus users who are in communication with the radio reception apparatus, the number of signals which are subjected to code division multiplexing become smaller than that in the case where the whole users transmit signals during this interval.

Consequently, in this case, an average value of the power value of the received signal outputted from the amplifier 13 to the controller 14 becomes smaller value than that in the case where the whole users transmit the signals. The controller 14 calculates an amplification factor from the average value of the smaller value and the target power value, and therefore, the amplification factor becomes lager than that in the case where the whole users transmit the signals.

Further, in the following description, a user who transmits signals actually to a radio reception apparatus while being provided with data to be transmitted in a plurality of radio transmission apparatus users, is called "inter-transmission user".

Here, "data to be transmitted" means voice data, image data and so forth, to be transmitted from a radio transmission apparatus, and "to transmit signals actually" means to transmit signals of voice data, image data and so forth except control signals.

In the case where the inter-communication user come into the inter-transmission user and the number of the inter-transmission users increases, since the number of signals being subjected to code division multiplexing to be outputted to the amplifier 13 from the radio unit 12 increases, the power increases. Accordingly, there is the problem that when the power of the signal is amplified in accordance with the above-described amplification factor which is calculated and then returned to the amplifier 13, the power value of the amplified signal exceeds the target power value.

In order to perform A/D conversion of the amplified signal which exceeds the target power value, since the number of bits of the A/D converter at a latter stage of the demodulators 18, 19, and 20 is required to be increased with surplus beforehand, thus the transmission efficiency deteriorates.

DISCLOSURE OF INVENTION

It is an object of the present invention to provide a radio reception apparatus and received power amplification method capable of calculating an appropriate amplification factor so that a power value of a received signal which is amplified does not exceed a target power value even when the number of inter-transmission users is changed.

The present inventor notes that the power value of the amplified signal exceeding the target power value is caused by the matter that an amplification factor is calculated on the basis of only the power value of the received signal. Thus the inventor finds that it is possible to calculate an appropriate amplification factor by considering the number of the inter-transmission users and the number of the inter-communication users, to achieve the present invention.

Accordingly, in the present invention, in order to achieve the above-mentioned object, the radio reception apparatus calculates a power value of a received signal per one person of inter-transmission users from both of a power value of the received signal and the number of the inter-transmission users, thus estimating a power value in the case where the whole inter-communication users come into inter-transmission users.

BEST MODE FOR CARRYING OUT THE INVENTION

Hereinafter, there will be described embodiments of the present invention in detail referring to accompanying drawings.

Embodiment 1

There will be described an embodiment 1 of the present invention while employing FIG. 2 and FIG. 3.

Figure 2:
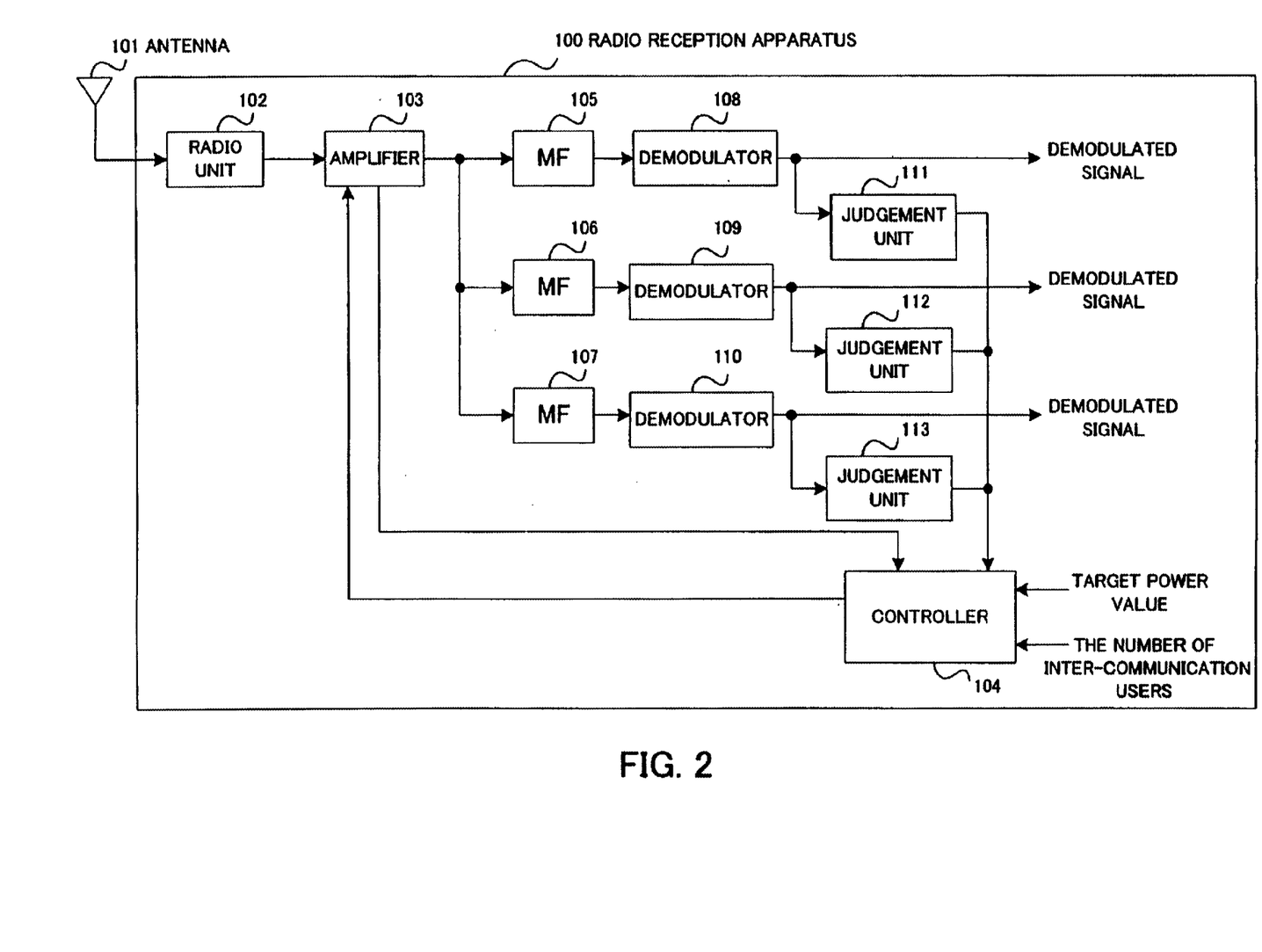
FIG. 2 is a block diagram illustrating a configuration of a radio reception apparatus according to an embodiment 1 of the present invention.
Figure 3:
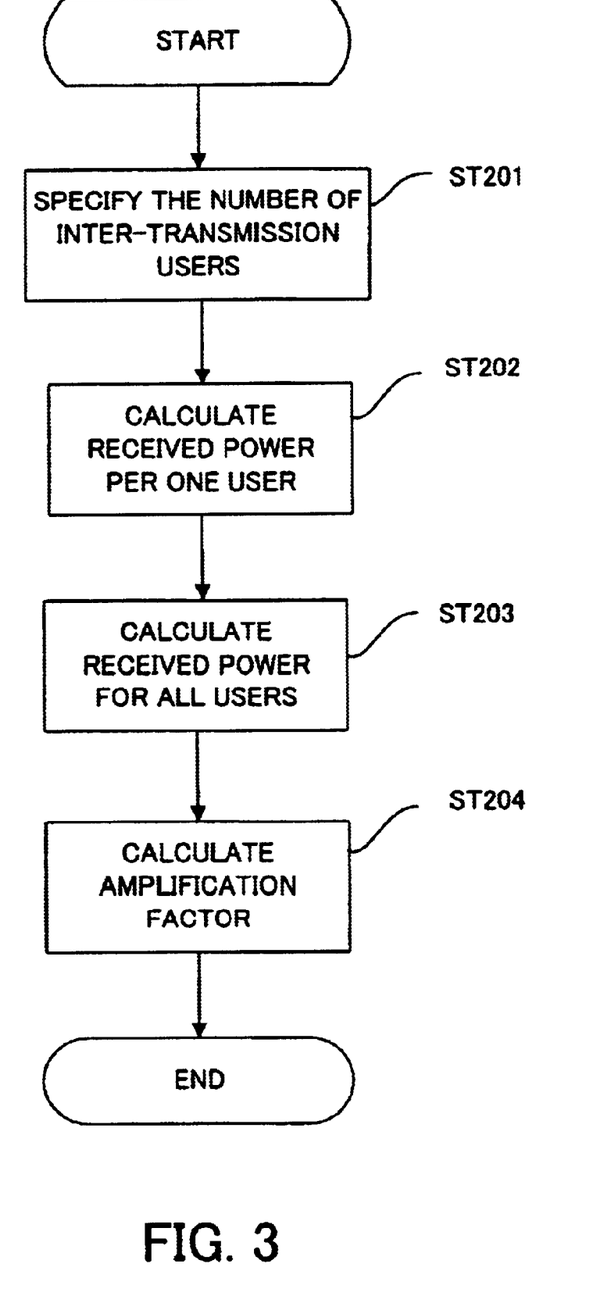
FIG. 3 is a flowchart showing an amplification factor calculation method according to the embodiment 1 of the present invention.

FIG. 2 is a block diagram illustrating a configuration of a radio reception apparatus according to the embodiment 1 of the present invention. In a radio reception apparatus 100, signals received by an antenna 101 are subjected to predetermined radio processing at a radio unit 102, before being outputted to an amplifier 103.

Further, in the present embodiment, it is supposed that signals received by the antenna 101 are signals which are subjected to spreading with respective spreading codes whose spreading factors are equal to each other, and then multiplexing.

The amplifier 103 outputs a signal indicating a power value of a received signal to a controller 104. The controller 104 calculates an amplification factor in accordance with a calculation method described later so that the power value of the signal outputted to matched filters 105, 106, and 107 from the amplifier 103 become constant in conformity with a target power value. The controller 104 performs feedback of a control signal instructing an amplification factor to the amplifier 103. The amplifier 103 amplifies power of a received signal in accordance with the amplification factor undergoing feedback, then, outputting the amplified signal to the matched filters 105, 106, and 107.

Further, the power value of the received signal outputted to the controller 104 from the amplifier 103 employs average value being averaged over a predetermined time interval in order to relieve an influence of a noise. Further, in the case where the radio reception apparatus 100 receives signals transmitted from a plurality of radio transmission apparatus, a power value of a received signal outputted to the controller 104 from the amplifier 103 comes into a power value of the received signal which is subjected to code division multiplexing.

The matched filters 105, 106, and 107 each gives despreading processing to an amplified signal, before calculating a correlation value between the amplified signal and a spreading code to output to demodulators 108, 109, and 110 respectively. The demodulators 108, 109, and 110 each gives predetermined demodulation processing to the amplified signal on the basis of these correlation values, before outputting a demodulated signal to A/D converter and so forth at the latter stage while outputting the demodulated signal to judgement units 111, 112, and 113 respectively.

The judgement units 111, 112, and 113 judge whether each radio transmission apparatus user is an inter-transmission user or an inter-communication user in accordance with a method touched upon later. Then, in the case where the radio transmission apparatus user is the inter-transmission user, the judgement units 111, 112, and 113 each outputs a signal indicating that the user is an inter-transmission user to the controller 104.

Next, there will be described a calculation method of an amplification factor that the controller 104 calculates, while employing a flowchart showed in FIG. 3.

Firstly, in step (hereinafter, referred to as ST) 201, the number of inter-transmission users is specified. The specification of the number of the inter-transmission users is executed in accordance with, for instance, the following procedure.

Demodulated signals demodulated in the demodulators 108, 109, and 110 are outputted to the judgement units 111, 112, and 113 respectively. The judgement units 111, 112, and 113 judge whether each radio transmission apparatus user is an inter-transmission user or an inter-communication user in accordance with respective demodulated signals. In the case where the radio transmission apparatus user is an inter-transmission user, the judgement units 111, 112, and 113 output signals each indicating that the user is an inter-transmission user to the controller 104. Then, the controller 104 specifies the number of signals indicating that the user is an inter-transmission user as the number of the inter-transmission user.

The judgement of whether each radio transmission apparatus user is an inter-transmission user or an inter-communication user, is executed in accordance with, for instance, the following method. Namely, a predetermined threshold value for amplitude of a demodulated signal is set in the judgement units 111, 112, and 113. The threshold value of the amplitude is set in such a way that, for instance, a power value of a signal transmitted by every one person of the inter-transmission user is a reference value.

The judgement units 111, 112, and 113 compare the predetermined threshold value with amplitude of the demodulated signals demodulated actually in the demodulators 108, 109, and 110, respectively. In the case where the amplitude of the demodulated signals demodulated actually exceeds the predetermined threshold value, the judgement units 111, 112, and 113 each judges that the radio transmission apparatus user who transmits the demodulated signal is an inter-transmission user. According to the judgement method, it is possible to judge a radio transmission apparatus user who is in the state of transmitting a signal such as voice data, image data actually as an inter-transmission user.

Further, a judgement method is not particularly limited to the above method, and another method is also usable.

Next, in ST 202, received power per one user is calculated. The controller 104 calculates a power value of a received signal per one person of the inter-transmission users from both of the power value of the received signal outputted from the amplifier 103 and the number of the inter-transmission users specified-above. Namely, the controller 104 divides the power value of the received signal by the number of the inter-transmission users specified-above. The controller 104 sets the obtained result of this division to the power value of the received signal per one person of the inter-transmission user.

Next, in ST 203, received power for the whole users is calculated. The controller 104 calculates power values (hereinafter referred to as "received power value for the whole users") of signals which the radio reception apparatus 100 receives, in the case where the whole of the inter-communication users come into inter-transmission users, from both of the power value of the received signal per one person of the inter-transmission users calculated-above and a signal indicating the number of the inter-communication users outputted from predetermined portion within the radio reception apparatus 100. Namely, the controller 104 multiplies the power value of the received signal per one person of the inter-transmission user by the number of the inter-communication users. The controller 104 sets the obtained multiplication result to the received power value for the whole users.

Then, in ST 204, the controller 104 calculates an amplification factor so that the received power value for the whole users calculated above comes into a target power value set in the controller 104 beforehand.

As described-above, according to the radio reception apparatus and the received power amplification method of the present embodiment, even when the number of inter-transmission users who are in the state of transmitting signals actually increase, it is possible to calculate an appropriate amplification factor so that a power value of an amplified signal does not exceed a target power value. Accordingly, it is possible to prevent the increase of a processing load on the A/D converter and so forth in the radio reception apparatus.

Embodiment 2

There will be described an embodiment 2 of the present invention while employing FIG. 4 and FIG. 5.

Figure 4:
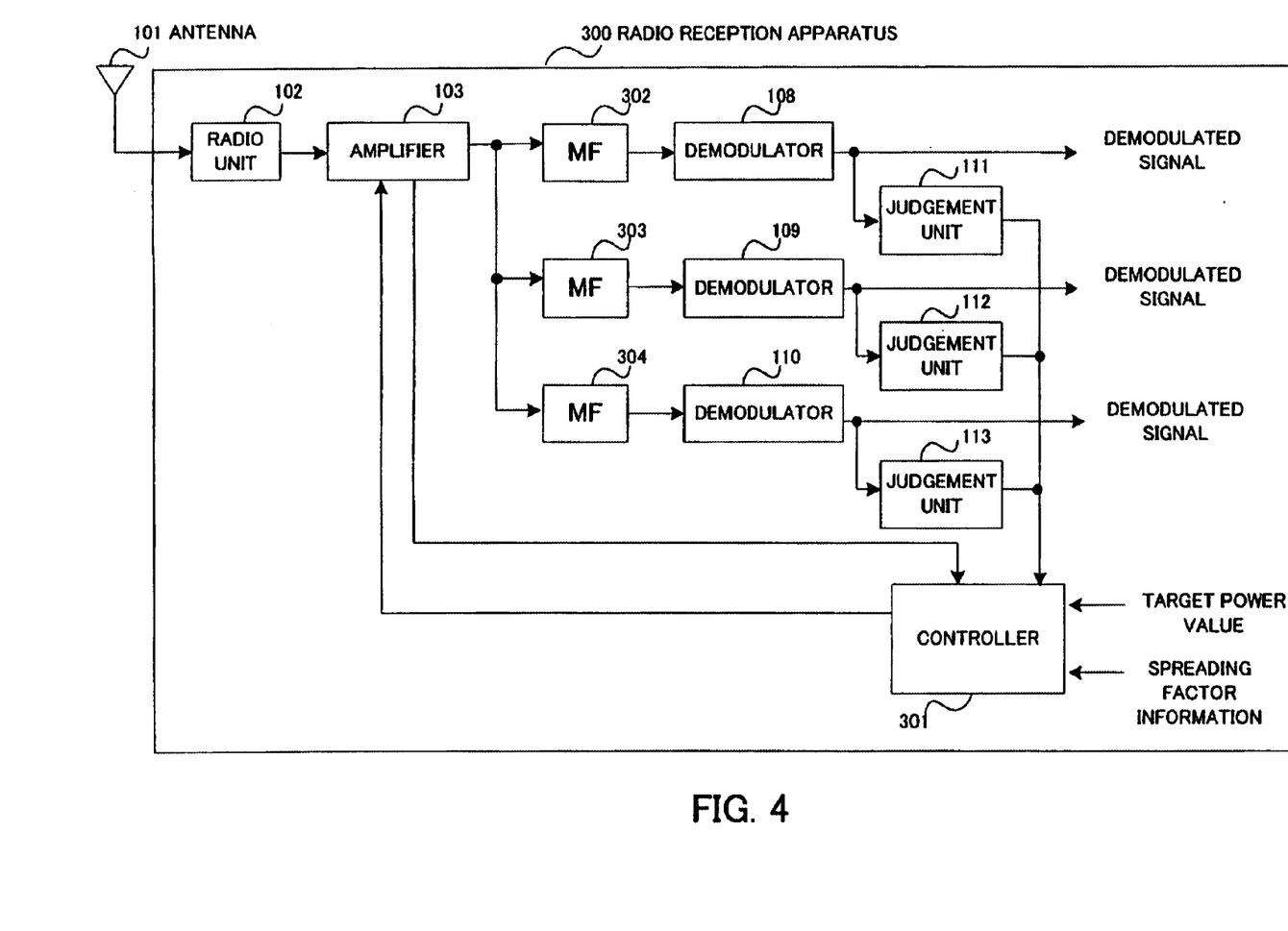
FIG. 4 is a block diagram illustrating a configuration of a radio reception apparatus according to an embodiment 2 of the present invention.
Figure 5:
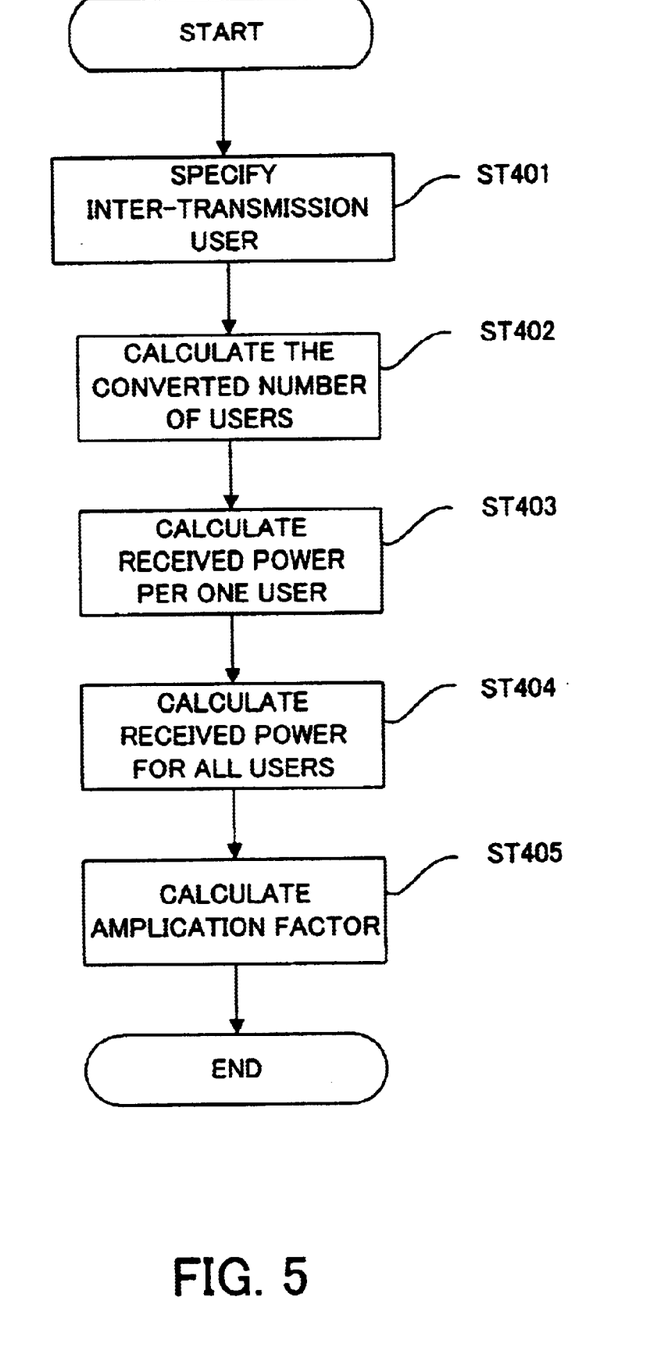
FIG. 5 is a flowchart showing an amplification factor calculation method according to the embodiment 2 of the present invention.

FIG. 4 is a block diagram illustrating a configuration of a radio reception apparatus according to the embodiment 2 of the present invention. However, in FIG. 4, the same number is added to about the same configuration/operation as that of FIG. 2 to omit the description.

In the embodiment 1, it is supposed that signals received by the antenna 101 are subjected to spreading with respective spreading codes whose spreading factors are equal to each other, and then multiplexing. On the other hand, in the present embodiment, it is supposed that signals received by the antenna 101 are subjected to spreading with respective spreading codes whose spreading factors are different, and then multiplexing.

In a radio reception apparatus 300, a controller 301 calculates an amplification factor in accordance with a calculation method described later so that the power value of the signal outputted to matched filters 302, 303, and 304 from the amplifier 103 become a constant in conformity with a target power value. The controller 301 performs feedback of a control signal instructing the amplification factor to the amplifier 103.

The matched filters 302, 303, and 304 each executes despreading processing with respective spreading factors which are different from each other set in the respective matched filters. Here, there will be described that spreading factors to be set are fixed spreading factors. However, the spreading factors are not limited to the fixed spreading factor. The spreading factors to be set may be variable, for instance, on the basis of spreading factor information.

In the case where signals which are subjected to spreading with the spreading factors each equal to the set spreading factor are multiplexed in a received signal, the matched filters 302, 303, and 304 each gives despreading processing to an amplified signal with the respective spreading codes of the spreading factors set previously. The matched filters 302, 303, and 304 each calculates a correlation value between the amplified signal and the spreading code, and output the correlation value to the demodulators 108, 109, and 110 respectively.

Next, there will be described a calculation method of an amplification factor that a controller 301 calculates, while employing a flowchart showed in FIG. 5.

In the following description, for instance, the spreading factors set in the matched filters 302, 303,and 304 are taken to be A, B, and C respectively. The spreading factor B is two times as large as the spreading factor A, further, the spreading factor C is two times as large as the spreading factor B.

Furthermore, the number of inter-communication users is three. Moreover, the spreading factors (spreading factor of the inter-communication user) inputted to the controller 301 as spreading factor information is A, B, or C. Still moreover, the inter-transmission user is one, who transmits signals with the spreading factor B.

Firstly, in ST 401, an inter-transmission user is specified. The matched filters 302, 303, and 304 each gives despreading processing to the amplified signal, and output a correlation value to demodulators 108, 109, and 110 respectively. The demodulated signals demodulated in the demodulators 108, 109, and 110 are outputted to the judgement units 111, 112, and 113 respectively. The judgement units 111, 112, and 113 judge whether each radio transmission apparatus user is an inter-transmission user or an inter-communication user while employing the demodulated signals in accordance with the method described in the embodiment 1. In the case where the radio transmission apparatus user is the inter-transmission user, the judgement units 111, 112, and 113 output signals each indicating that the user is the inter-transmission user to the controller 301.

The controller 301 observes which judgement unit outputs the signal indicating that the user is an inter-transmission user. Thus, the controller 301 specifies the inter-transmission user by specifying the judgement unit which outputs a signal indicating that the user is an inter-transmission user.

Specifically since the inter-transmission user transmits signals with the spreading factor B, the amplitude of the demodulated signal being subjected to despreading processing at the matched filter 303 in which the spreading factor B is set, exceeds the threshold value. Further, amplitude of the demodulated signals outputted to the other judgement units 111 and 113 except the judgement unit 112, does not exceed the threshold value.

Consequently, only the judgement unit 112 outputs a signal indicating that the user is an inter-transmission user to the controller 301. The controller 301 specifies that the judgement unit which outputs a signal indicating that the user is an inter-transmission user is the judgement unit 112. Namely, the controller 301 specifies that the user who transmits signals with the spreading factor B is a inter-transmission user.

Next, in ST 402, the converted number of users is calculated. In a communication system which utilizes CDMA system, a communication quality deteriorates due to a low spreading factor. In order to prevent deterioration of the communication quality caused by the low spreading factor, the communication system controls signals so as to enlarge power values of signals with respect to signals with low spreading factors. Due to this control, an energy of a signal per one bit is kept constant, thus, the communication quality is stabilized. For instance, in the case where the communication system makes the spreading factor of a signal is ½ times as large as that of the original spreading factor, the communication system makes the power value of the signal 2 times as large as that of the original power value.

Consequently, in the case where the power value of the signal with the spreading factor C being set to a reference is taken to be 1 (one), the power value of the signal with the spreading factor B comes into 2 (two), and further, the power value of the signal with the spreading factor A comes into 4 (four). Here, a power value of a signal per one bit is replaced by the number of users. So, the power value of the signal with the spreading factor C corresponds to one person. The power value of the signal with the spreading factor B corresponds to two persons. The power value of the signal with the spreading factor A corresponds to four persons.

Consequently, the controller 301 converts the power value into the number of persons in accordance with the spreading factors (spreading factor of the inter-communication user) A, B, and C inputted to the controller 301 by way of the spreading factor information. Then the controller 301 calculates that the number of the inter-communication users is seven. Further, the controller 301 converts the power value into the number of persons in accordance with specified result of the inter-transmission user of ST 401 (specified result that the users who transmit signals with the spreading factors B are a specified to be the inter-transmission users). Then the controller 301 calculates that the number of the inter-transmission users is two.

Next, in ST 403, received power per one user is calculated. The controller 301 calculates a power value of a received signal per one person of the inter-transmission users from both of the power value of the received signal outputted from the amplifier 103 and the number of the inter-transmission users calculated-above. Namely, the controller 301 divides the power value of the received signal by the number of the inter-transmission users calculated-above. The controller 301 sets the obtained result of this division to the power value of the received signal per one person of the inter-transmission user.

Next, in ST 404, received power for the whole users is calculated. The controller 301 calculates a received power value for the whole users from both of the power value of the received signal per one person of the inter-transmission user calculated-above and the number of the inter-communication users calculated-above. Namely, the controller 301 multiplies the power value of the received signal per one person of the inter-transmission user by the number of the inter-communication users. The controller 301sets the obtained multiplication result to the received power value for the whole users.

Then, in ST 405, the controller 301 calculates an amplification factor so that the received power value for the whole users calculated-above comes into a target power value set in the controller 301 beforehand.

Further, in the present embodiment, the spreading factor is set to A, B, or C. The spreading factor B is set to 2 times the spreading factor A, furthermore, the spreading factor C is set to 2 times the spreading factor B. However, more kinds of spreading factor are usable to be employed. Further, a relationship between respective spreading factors is not limited to the relationship described-above.

Furthermore, in the present embodiment, the converted number of users is calculated on the basis of the matter that when the spreading factors are different, the power values of the received signals are also different. However, even when spreading factors are equal, the received power values are different in accordance with the difference between required communication qualities. Consequently, in this case, the converted number of users is calculated while employing both of the spreading factor and the communication quality.

As described-above, according to the radio reception apparatus and the received power amplification method of the present embodiment, even when signals multiplexed in the received signals are subjected to spreading with a plurality of spreading factors and further the number of inter-transmission users who are in the state of transmitting signals actually increase, it is possible to calculate an appropriate amplification factor so that a power value of an amplified signal does not exceed a target power value. Accordingly, it is possible to prevent the increase of a processing load on the A/D converter and so forth in the radio reception apparatus.

Further, in the radio reception apparatus of the embodiment 2, respective three matched filters, three demodulators, and three judgement units are provided for the radio reception apparatus. However, a configuration of the radio reception apparatus is not limited to the above. The radio reception apparatus may be provided with each at least, one matched filter, one demodulator, and one judgement unit. Further, the number of inter-communication users and the number of inter-transmission users are not limited.

As described above, according to the present invention, even when the number of inter-transmission users is changed, it is possible to calculate an appropriate amplification factor so that a power value of a received signal which is amplified does not exceed a target power value.

The present description is based on the Japanese Patent Application No. HEI 11-103045 applied on Mar. 6, 1999. The whole content thereof is included in the description.

Industrial Applicability

The present invention is applicable to a base station apparatus employed in a radio communication system, and/or a communication terminal apparatus such as mobile station which performs radio communication with the base station apparatus.

What is claimed is:

1. A radio reception apparatus comprising:
   a judgment unit that judges whether radio transmission apparatus users that are each in a first communication state, in which the users are in communication with a radio apparatus, are also in a second communication state, in which the users actually transmit signals;
   a controller that:
   (a) divides the intensity of a received signal by the number of users judged to be in the second communication state to produce a division value,
   (b) multiplies the division value by the number of users in the first communication state to produce an estimate of the intensity of a prospective signal that would be received in the case where all the users in the first communication state come into the second communication state, and
   (c) changes an amplification factor for the received signal in accordance with the estimate; and
   an amplifier that amplifies the received signal in accordance with the changed amplification factor.

2. The radio reception apparatus according to claim 1, wherein:
   the judgment unit compares an amplitude value of the received signal with a predetermined threshold value; and
   if the amplitude value exceeds the threshold value, the judgment unit judges the radio transmission apparatus user who transmitted the received signal to be a radio transmission apparatus user in the second communication state.

3. A base station apparatus comprising the radio reception apparatus of claim 1.

4. A communication terminal apparatus comprising the radio reception apparatus of claim 1.

5. A radio reception apparatus comprising:
   a judgment unit that determines whether radio transmission apparatus users that are determined to be in a first communication state, in which the users are in communication with a radio apparatus, are also in a second communication state, in which the users actually transmit signals;

a controller that:
(a) divides the intensity of a received signal by the number of users in the first communication state to produce a division value,
(b) multiplies the division value by the number of users in the second communication state to produce an estimate of the intensity of a prospective signal that would be received in the case where all the users in the first communication state come into the second communication state, and
(c) changes an amplification factor for the received signal in accordance with the estimate; and an amplifier that amplifies the received signal in accordance with the changed amplification factor, wherein:

the numbers of users determined by the judgment unit to be in the first and second communication states are calculated using a spreading factor of a signal that is multiplexed in the received signal.

6. The radio reception apparatus according to claim 5, wherein:

the judgment unit compares an amplitude value of the received signal with a predetermined threshold value; and if the amplitude value exceeds the threshold value, the judgment unit determines the radio transmission apparatus user who transmitted the received signal to be a radio transmission apparatus user in the second communication state.

7. A base station apparatus comprising the radio reception apparatus of claim 5.

8. A communication terminal apparatus comprising the radio reception apparatus of claim 5.

9. A received power amplification method comprising:

judging whether radio transmission apparatus users that are each in a first communication state, in which the users are in communication with a radio apparatus, are also in a second communication state, in which the users actually transmit signals;

dividing the intensity of a received signal by the number of users judged to be in the second communication state to produce a division value;

multiplying the division value by the number of users in the first communication state to produce an estimate of the intensity of a prospective signal that would be received in the case where all the users in the first communication state come into the second communication state;

changing an amplification factor for the received signal in accordance with the estimate; and amplifying the received signal in accordance with the changed amplification factor.

10. A received power amplification method comprising:

determining whether radio transmission apparatus users that are determined to be in a first communication state, in which the users are in communication with a radio apparatus, are also in a second communication state, in which the users actually transmit signals;

dividing the intensity of a received signal by the number of users in the first communication state to produce a division value;

multiplying the division value by the number of users in the second communication state to produce an estimate of the intensity of a prospective signal that would be received in the case where all the users in the first communication state come into the second communication state;

changing an amplification factor for the received signal in accordance with the estimate; and amplifying the received signal in accordance with the changed amplification factor, wherein the numbers of users determined to be in the first and second communication states are calculated using a spreading factor of a signal that is multiplexed in the received signal.

\* \* \* \* \*